S. F. DALE.
SPRING STRUCTURE.
APPLICATION FILED NOV. 17, 1919.

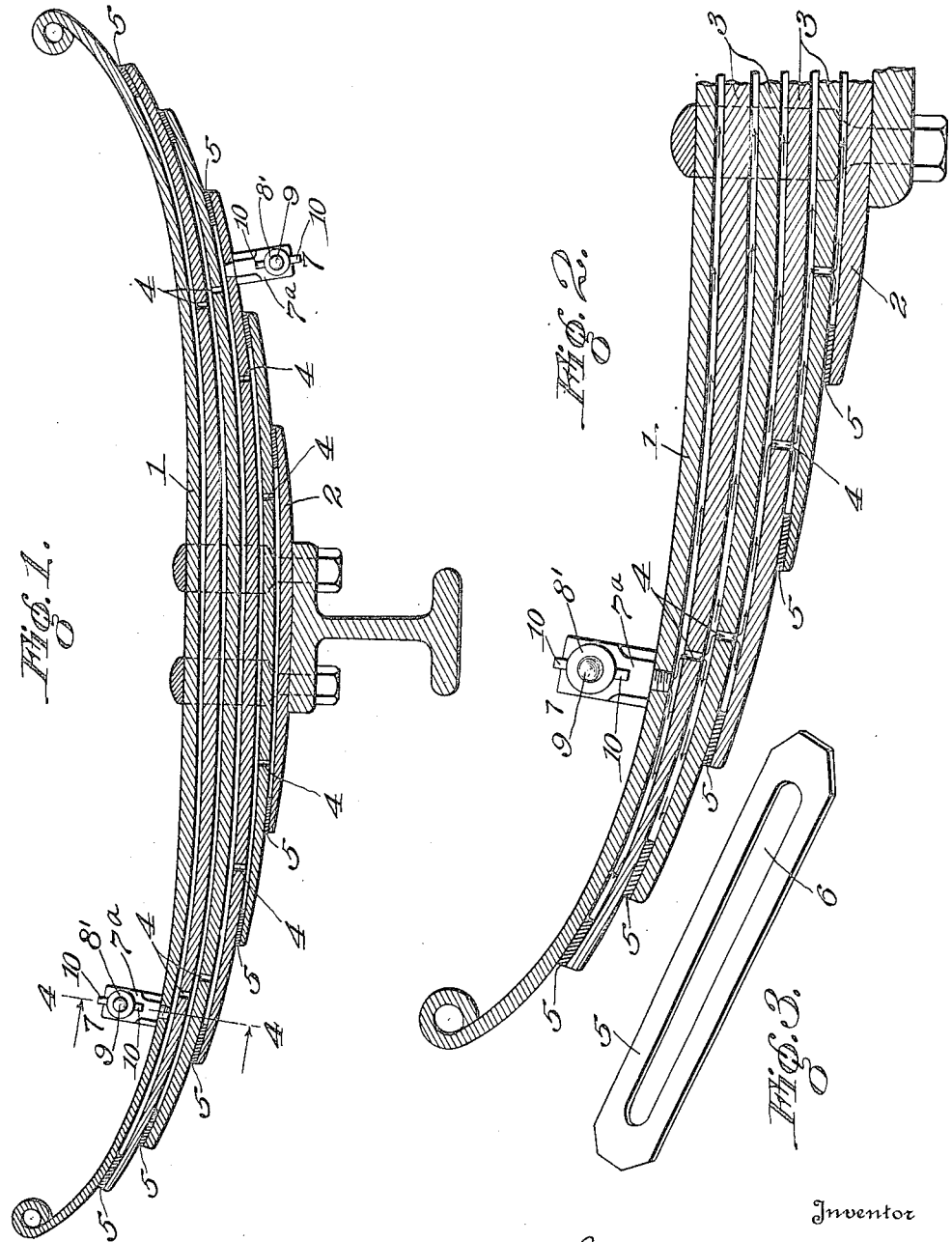

1,435,814.

Patented Nov. 14, 1922.
3 SHEETS—SHEET 2.

Inventor
Sylvester F. Dale,
By
Edmund H. Parry
Attorney

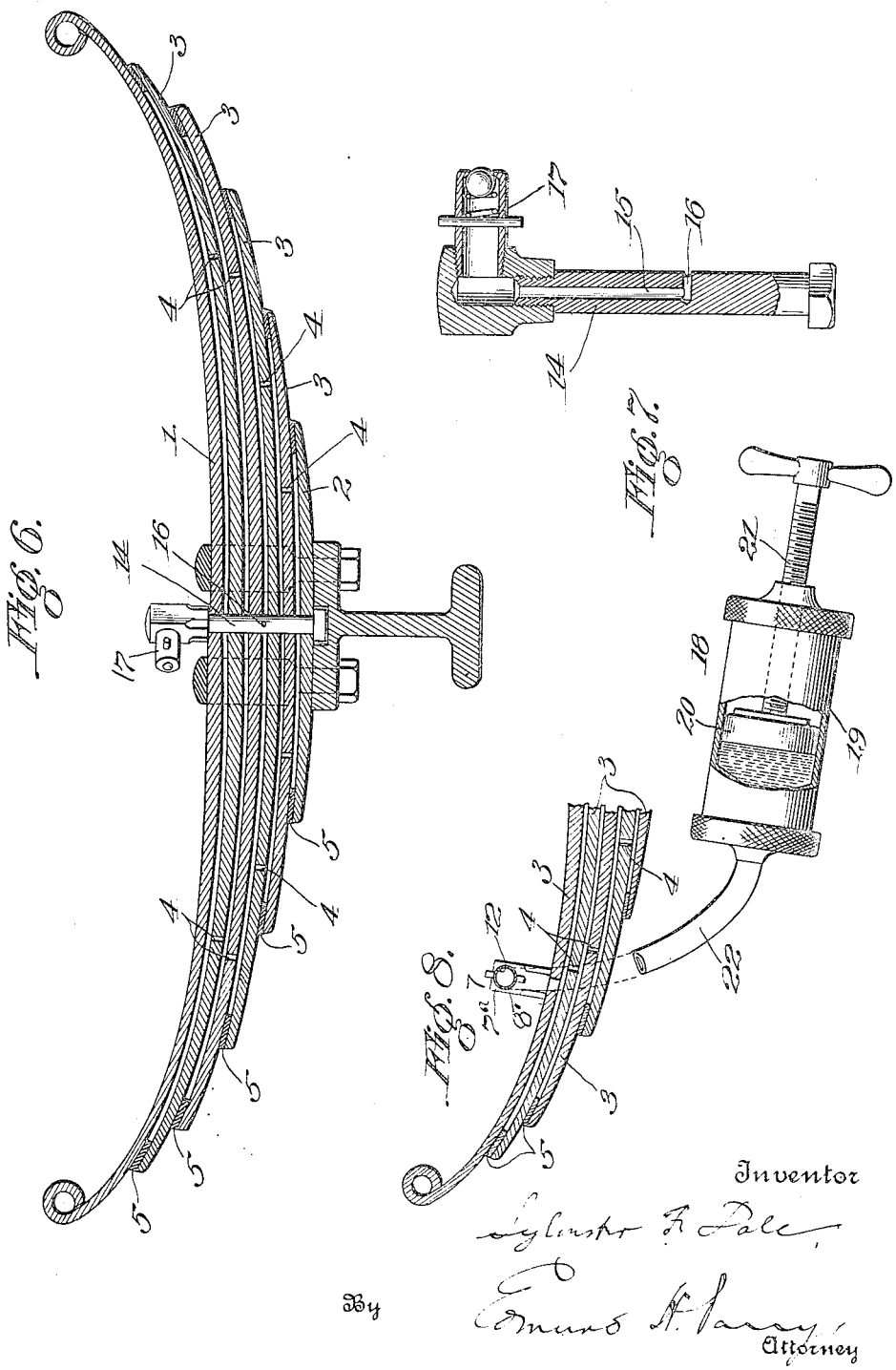

Patented Nov. 14, 1922.

1,435,814

UNITED STATES PATENT OFFICE.

SYLVESTER F. DALE, OF WILLIAMSPORT, PENNSYLVANIA, ASSIGNOR TO CENTER-FED SPRING INSERT CO., OF RIDGWAY, PENNSYLVANIA, A CORPORATION OF DELAWARE.

SPRING STRUCTURE.

Application filed November 17, 1919. Serial No. 338,459.

*To all whom it may concern:*

Be it known that I, SYLVESTER F. DALE, a citizen of the United States, residing at Williamsport, in the county of Lycoming and State of Pennsylvania, have invented certain new and useful Improvements in Spring Structures, of which the following is a specification, reference being had therein to the accompanying drawing.

This invention relates to spring-structures, and has reference, more especially, to means associable with the leaves or laminæ thereof for maintaining them constantly lubricated.

The primary object of the invention is to provide a spring-structure which shall, at all times, have its leaves or laminæ effectually lubricated by the employment of simple but effective instrumentalities, whereby the lubricant may, first, be introduced into the structure, and, then, be caused automatically to work itself over the engaging surfaces of the leaves or laminæ; and thereby any substantial wear of the leaves is prevented, all friction engendered between the contacting leaves is reduced to a minimum, all action of the structure becomes noiseless, and all danger of breaking of any of the parts thereof is precluded.

A further object of the invention is to provide a spring-structure comprising a plurality of spring leaves or laminæ which shall have such leaves or laminæ so related to each other, and to a source of external supply of lubricant, that a body of the lubricant may initially be projected into the structure, then forced to the extremities thereof, and eventually, as the spring-structure performs its normal operation, be caused to lubricate the entire area of the engaging surfaces of the leaves; there being a body or ribbon of lubricant initially positioned between the leaves so that such lubricant may automatically work itself into places where the movement of the leaves requires it.

A still further object within the contemplation of the invention is to provide a spring-structure which includes one or more points, preferably located on or in the outside leaves or laminæ of the structure, and a series of ducts and passages which communicate with each other, and with said point of lubricant-introduction, whereby a body of lubricant may be initially introduced at such point and then projected to the extremities of the leaves or laminæ; and which arrangement is made possible without material weakening of any of the parts of the structure.

With these and other objects in view, the invention resides in means associated with the several leaves or laminæ of a spring-structure for receiving and holding a mass of lubricant which is introduced at an external point on the structure, and whereby a continuous passage of the lubricant from the point of introduction to the extremities of the leaves is rendered possible.

I am aware that, heretofore, attempts have been made to provide spring-structures with various types of lubricating devices; but, in most instances, these have involved the serious weakening of the structure, or, if that be not the case, such types have involved a radical reconstruction of the spring-structure so that existing structures could not be supplied with the lubricators. My invention is a distinct departure from these proposed types, as will hereinafter be made to appear.

In order that the invention may be more readily comprehended, I have disclosed in the accompanying drawings an embodiment thereof; but it is to be understood that the invention is susceptible to a wide range of modification and variation without departing from its salient features and underlying principles, and that it is capable of other utilizations than that herein revealed.

In these drawings:—

Fig. 1 is a side view in vertical section of a spring-structure with my invention embodied therein;

Fig. 2 is a fragmentary sectional view, on an enlarged scale, showing a plurality of spring leaves with interposed spacing-members or inserts, and showing particularly the path of flow of the lubricant from the initial point of its introduction to the extremities of the leaves;

Fig. 3 is a view in perspective of one of the spacing-members or inserts, detached;

Fig. 6 is a view in central longitudinal section of a modified form of spring-structure;

Fig. 7 is a view in detail of the centrally-disposed lubricant-introducing device shown in Fig. 6; and Fig. 8 is a fragmentary sectional elevation showing the spring structure associated with a form of oil-gun different from that illustrated in Fig. 5.

Figure 5:
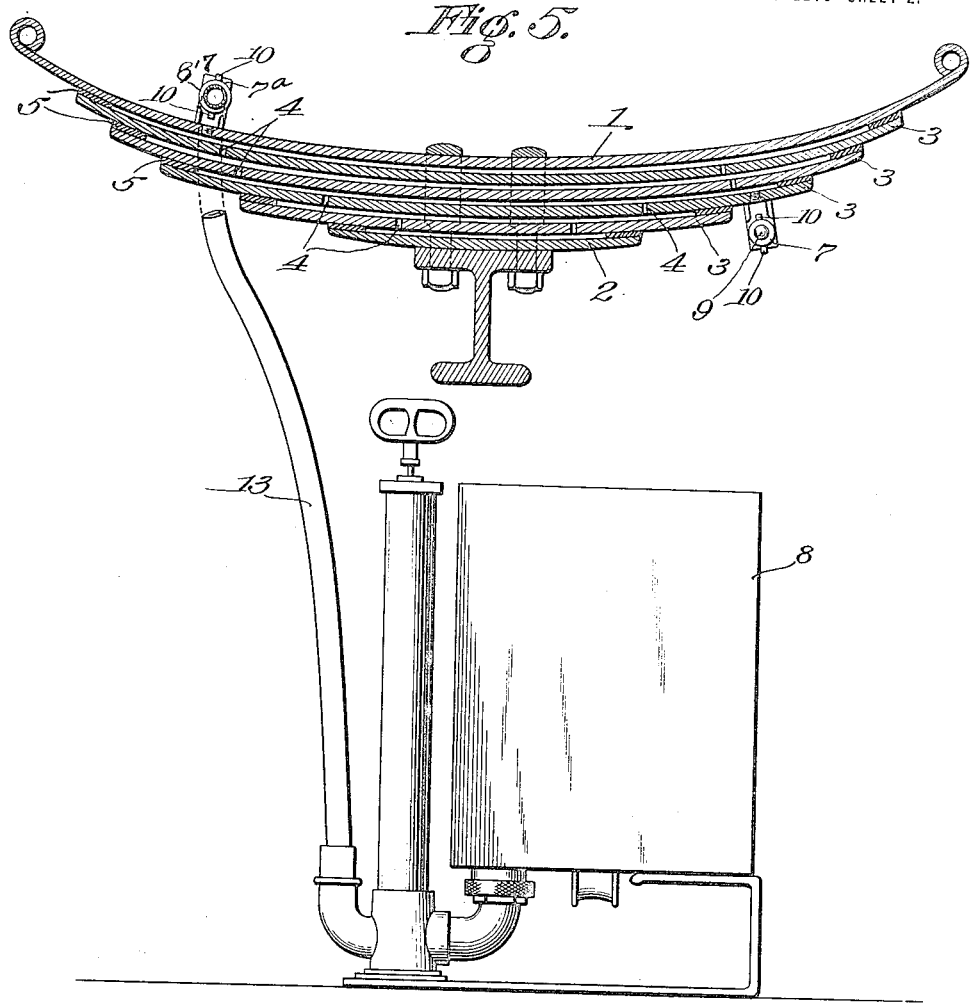
Fig. 5 is a view in vertical section, showing the spring-structure and an associated oil-gun (so-called), whereby the lubricant is initially introduced into the structure and forced by pressure developed by the gun to the extremities of the members or inserts and, thus, to the extremities of the embracing spring leaves or laminæ.
Figure 4:
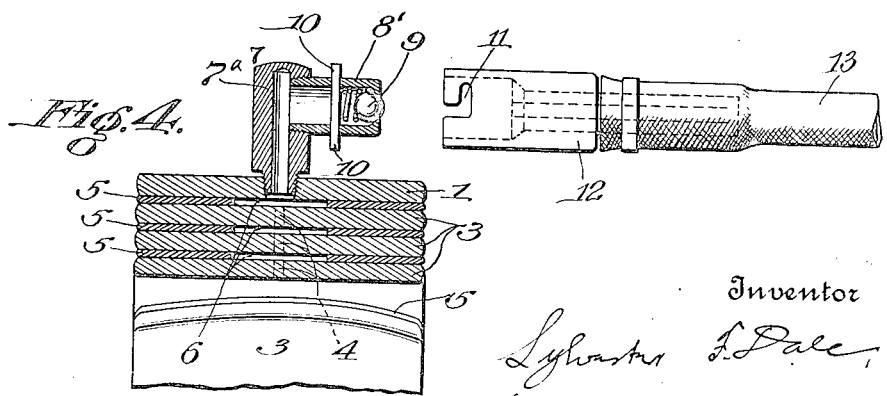
Fig. 4 is a view in vertical section, on the line 4—4, Fig. 1, of one of the lubricant-controlling devices which is mounted on one of the leaves and in communication with the lubricant-duct in the proximate spacing-member or insert.

Referring to these drawings, the reference-numeral 1 designates an upper or outer spring leaf; 2 a lower or outer spring leaf; and 3 intermediate leaves. These are of the usual construction, and, when aggrouped, constitute spring-structures of the customary elliptical, semi-elliptical, and quadri-elliptical types of forms.

These leaves may be secured in any proper manner, as by clips or U-bolts.

Each of the intermediate leaves 3 is provided with one or more oil apertures or passages 4, these being arranged, in the several intermediate leaves, in relatively unaligned and unregistering positions; in other words, they are preferably formed in the different leaves in relatively staggered relation.

Interposed between the several intermediate leaves, as well as between the intermediate leaves and the outer leaves 1 and 2, are spacer-members or inserts 5, preferably made of metal and of steel somewhat softer than that of the spring leaves. These members or inserts are preferably of the same length as one of the leaves with which they contact and are each provided with an elongated slot or duct 6 which is, preferably and as shown, of less length than either of the leaves between which the insert is disposed. The apertures 4 of two proximate leaves communicate with the duct 6 so that, as shown in Fig. 2 for instance, there is a continuous passage for lubricant through the respective intermediate leaves and into the several inserts. By disposing the apertures and leaves in unaligned position relatively, the lubricant will travel in the duct 6, and thence through the aperture 4 in the leaves until the entire passage constituted by the ducts 6 and the apertures 4 is filled with lubricant, or practically so. Then as the leaves perform their normal function, the surfaces of the leaves, and especially those which are in contact, are thoroughly lubricated.

Any type of lubricant may be employed, but I prefer to utilize that which has sufficient fluidity to permit its being conveniently introduced into the spring-structure and forced to the extremities of the inserts readily.

Any preferred means for introducing the fluid lubricant into the structure may be utilized; but I have found in practice that that which is shown in the embodiment of Figs. 1 to 5 is most desirable and efficient. This contemplates the mounting of oil-receiving devices, marked generally 7, and with which a so-called oil-gun 8 is adapted to be associated when the filling operation is to be performed. The devices 7 which, preferably and as shown, are each in the form of a ball-check-nipple, include a leaf-attaching member or portion 7ª and a tubular gun-attaching portion or member 8' adapted to be threaded into one or another of the leaves 1, 2 or 3 and, preferably, adjacent to one end thereof. Disposed in the member 8' is a spring-controlled ball 9 adapted to exclude dust from the atmosphere, but permitting the device 7 to be, when connected to the oil-gun, opened as a valve and allow the introduction of the lubricant from the gun into the duct of the nearest insert. From this it is, under the pressure developed in the oil-gun, forced through the aperture in the next proximate spring-leaf, and having passed therethrough, it enters the duct in the contacting insert; and so on throughout the several inserts and leaves. By these instrumentalities, the lubricant, introduced at the point of the valve member 7, is projected into the several ducts 6 of the inserts and the apertures 4 in the leaves which communicate therewith, permitting the flow of the lubricant from one duct to another.

To facilitate the connection of the oil valve 7 with the oil-gun, the tubular member 8' is provided with outstanding pins or lugs 10 adapted to engage in slots 11 formed in a nozzle 12 of a flexible tube 13 that is attached to the oil-gun. While I have thus described an oil-gun, it is to be understood that any other form of pressure or lubricant-forcing device may be employed.

By this arrangement, whenever required, the ducts 6 and apertures 4, as well as the surfaces of the spring leaves, may be thoroughly flushed and cleaned—of old lubricant, grit, etc.—by forcing a body of kerosene, gasoline, or other similar medium into the oil valve and thence through the ducts and apertures. After this operation is completed, the lubricant may be similarly projected into the structure.

While one oil device at one end of the structure would ordinarily suffice, nevertheless, I prefer to employ at least two of these, and adjacent to the opposite extremities of the structure, as shown in Fig. 1.

In some instances, I may utilize an additional lubricant-introducing device disposed at the center of the spring-structure, such as is shown in Fig. 6; or, I may dispense with the oil valves at the extremities of the structure and employ only the central lubricant-introducing device; This device includes a bolt 14 preferably formed with central bore 15, which terminates in an opening 16 that registers with a duct in one of the inserts 5. Attached to the upper end of the bolt 14 is an oil valve 17 of somewhat the same construction and function as the oil valve 7. In this type of structure, the oil-gun is attached to the oil valve 17 and the oil projected therethrough and through the bolt 14 into the duct of the insert which registers with the opening 16 and from which point the lubricant is projected by the pressure developed in the oil-gun through the apertures in the springs and thence into the ducts until the entire structure is lubricated.

In Fig. 8, I have shown my improved spring structure associated with a form of oil-gun different from that illustrated in Fig. 5. In this instance, the gun, marked 18, includes an oil-containing cylinder 19 in which an oil-forcing piston 20 operates, the piston being actuated by a threaded member 21. The gun, itself, is connected to one of the oil-receiving devices 7 by a flexible tubing 22, as shown.

From the foregoing, it will be perceived that I have devised an exceedingly simple system of spring-lubrication, involving a series of inserts provided with elongated ducts or slots which communicate with apertures or passages formed at predetermined points—preferably adjacent the extremities of the spring leaves—whereby a lubricant may be introduced at one point, or at a plurality of points, of the structure and forced through a continuous passage (comprising the several ducts in the insert, and the apertures in the springs) to effect a positioning of the lubricant against the surfaces of the spring leaves, whereupon such lubricant will, under the normal action of the structure, be distributed over the contacting portions of the spring-leaves so that they may be completely, effectively and constantly lubricated. A feature of primary importance of this structure is to fill the oil-passage comprising the ducts in the inserts and the apertures in the springs from time to time, as occasion demands, so that in the normal operation of the spring-structure the lubricant will be distributed from the duct 6 on the contacting surfaces of the leaves. The introduction of the lubricant by means of the aforementioned oil-gun can conveniently be accomplished at the time that lubricant is being introduced in the associated motor of an automobile, for instance, and be accomplished in a relatively shorter time than is now required to fill the common form of grease-cups, but with far greater efficiency. The invention of the present case is to be differentiated from the structures of a somewhat similar character in the prior art in that the lubricant is preferably introduced at one or another of the extremities of the spring-structure, and caused to flow to the opposite extremity thereof and, in fact, to all parts of the structure through a series of ducts and communicating passages formed respectively in the inserts and in the proximate leaves, such passages in the leaves being unalined so as to provide a circuitous path of travel for the lubricant as it moves from one to another part of the structure, with the essential result that the entire structure is put in condition to lubricate itself continually and efficiently, and has the additional capability of being flushed out and cleaned from time to time, as occasion demands.

What I claim is:

A spring-structure comprising superposed leaves; a spacer-element disposed between the facing surfaces of certain of the leaves; said spacer-element comprising a body shaped to conform approximately to the edge contour of one of the leaves between which it is placed, and provided with an elongated cut-out portion; the marginal edges of the spacer-element and the surfaces of the spring leaves between which it is placed forming a continuous duct for the passage of lubricant extending approximately the length of the smaller of the leaves between which it is placed; certain of the leaves being provided, toward their outer extremities, with an opening communicating with the elongated duct whereby lubricant may be circulated between the leaves; and means for permitting lubricant to be forced into the ducts, associated with one of the openings.

In testimony whereof I affix my signature in presence of two witnesses.

SYLVESTER F. DALE.

Witnesses:
A. R. JACKSON,
C. OWEN FRY.